United States Patent [19]
Hernandez

[11] 3,792,856
[45] Feb. 19, 1974

[54] ARBOR FOR SECURING A WORKPIECE
[75] Inventor: Manuel R. Hernandez, Westland, Mich.
[73] Assignee: Etronic Corporation, Detroit, Mich.
[22] Filed: Oct. 12, 1971
[21] Appl. No.: 188,231

[52] U.S. Cl. ................. 269/48.1, 269/52, 269/229, 279/2
[51] Int. Cl. ........................ B23q 3/14, B23b 31/40
[58] Field of Search ...... 269/47, 48.1, 52, 196, 199, 269/200, 229; 279/2; 82/44

[56] References Cited
UNITED STATES PATENTS

| | | | |
|---|---|---|---|
| 963,603 | 7/1910 | Lunceford | 269/48.1 |
| 1,235,957 | 8/1917 | Bidwell | 279/2 |
| 1,407,145 | 2/1922 | Gasteiner | 279/2 |
| 2,499,781 | 3/1950 | Rothenberger | 279/2 |
| 2,698,551 | 1/1955 | Olsen | 279/2 X |
| 2,775,137 | 12/1956 | Chung | 192/150 X |
| 2,821,946 | 2/1958 | Goekler | 269/48.1 |
| 2,870,686 | 1/1959 | Smith | 279/2 X |
| 2,967,462 | 1/1961 | Yogus | 279/2 X |
| 2,989,316 | 6/1961 | Perry et al. | 279/50 |
| 3,100,117 | 8/1963 | Schneider et al. | 279/66 |

*Primary Examiner*—Othell M. Simpson
*Assistant Examiner*—Joseph T. Zatarga
*Attorney, Agent, or Firm*—Hauke, Gifford, Patalidis & DuMont

[57] ABSTRACT

A male arbor having axially spaced annular sections of different diameters and adapted to retain a female workpiece having a multi-diameter internal bore. Each of the annular sections includes a hub member, with the hub members coupled to each other. Annular members are carried by each of the hub members, with one of the annular members of each pair slidably mounted. Opposing tapered wedging surfaces define grooves for receiving balls which normally project radially from the grooves to grip the workpiece and which are retracted into the grooves upon axial separation of the annular members so that the workpiece can be removed from the arbor. Each annular section includes one of the annular members provided with a plurality of circumferentially spaced and longitudinally disposed bores extending therethrough and including a decreased diameter portion in axial alignment with a plurality of circumferentially spaced and longitudinally disposed threaded bores in the adjacent annular member. A plurality of threaded fastening members slidably extend through the bores in one annular member to be received by the bores of the adjacent annular member. The shank portion of each fastening member is of such a length as to permit axial movement of each movable annular member relative to the adjacent annular member. A plurality of springs carried by each of the shank portions of each fastening member exert a biasing force against its associated movable annular member to bias the same toward its adjacent annular member. The biasing force of the springs and thus the force projecting the balls radially from their associated grooves may be selectively varied.

5 Claims, 3 Drawing Figures

PATENTED FEB 19 1974  3,792,856
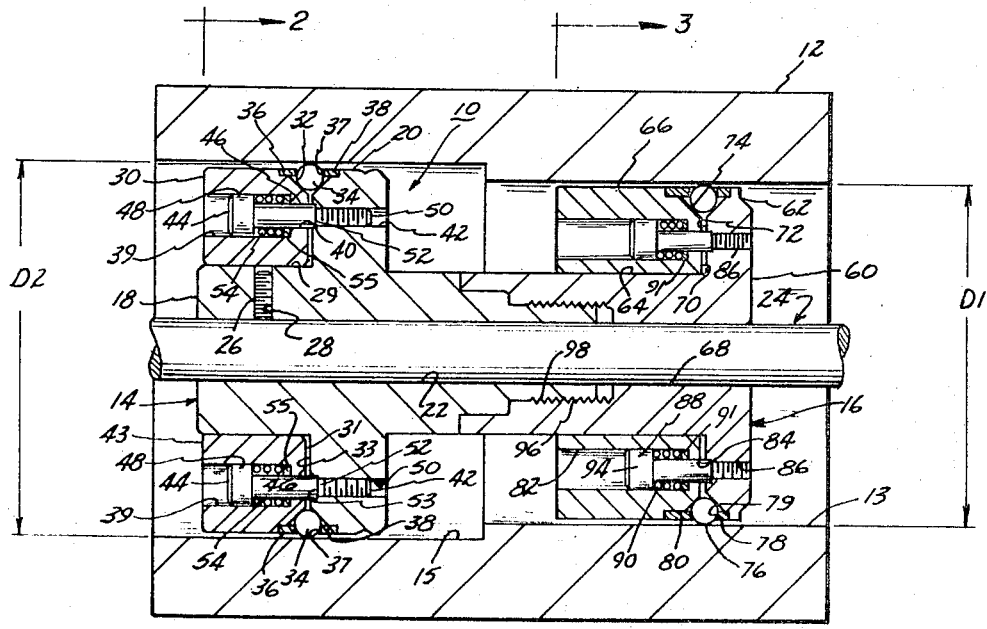
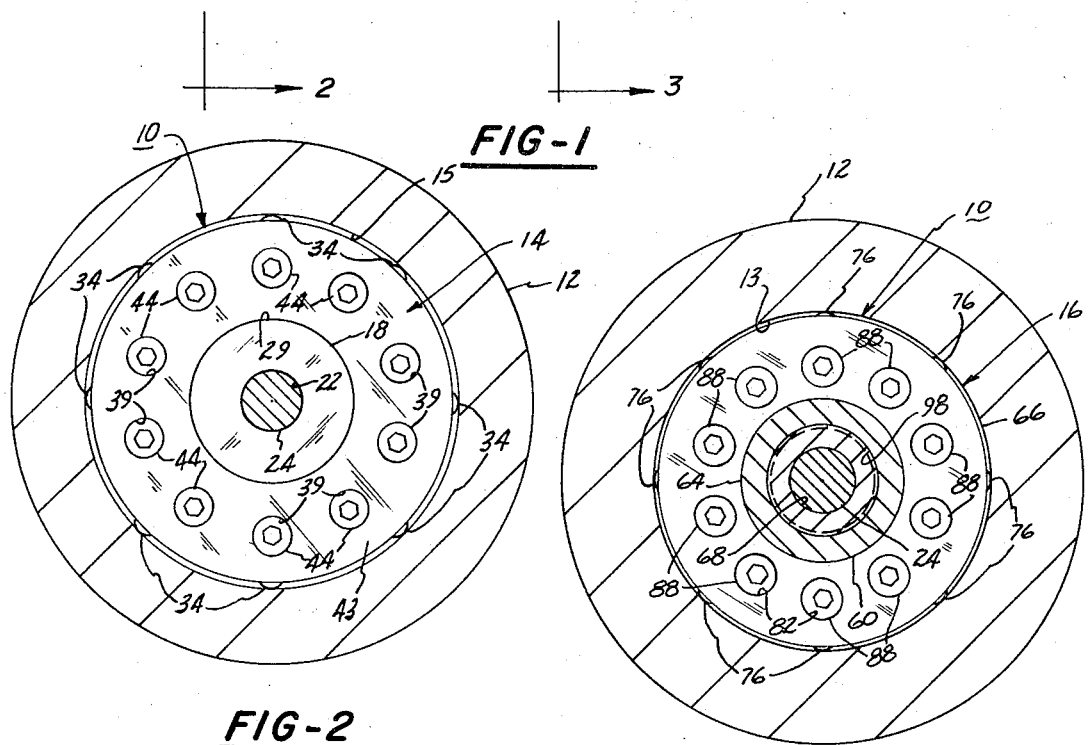
FIG-1
FIG-2
FIG-3
INVENTOR
MANUEL R. HERNANDEZ
BY
Hauke Gifford & Patalidis
Attorneys

ARBOR FOR SECURING A WORKPIECE

CROSS REFERENCE TO RELATED PATENT

The present invention is related in substance to U.S. Pat. No. 3,259,382 issued Jan. 5, 1966 and entitled "Ring Type Ball Grip Means."

BACKGROUND OF THE INVENTION

I. Field of the Invention

The present invention relates to arbors for mounting a workpiece and, in particular, to an arbor having means for variably controlling the retaining force exerted by the arbor on the workpiece.

II. Description of the Prior Art

Heretofore, numerous apparatus and devices have been employed to engage and hold a workpiece so as to facilitate a working operation thereon. Preferably such workpiece holders should be able to grasp the workpiece in a firm manner to accurately position the workpiece with respect to the tool which is to effect a working operation on the workpiece. It is particularly desirable that the workpiece holders be of such a nature that they can be quickly engaged and disengaged with the workpiece, yet that they be of sufficient strength to prevent the accidental separation of the workpiece from the holder, as such an accidental separation during a working operation could result in damage to the workpiece or to the holder and could cause injury to the operator.

It would thus be desirable to provide a workpiece holder which has a coupling structure which can be quickly engaged with and disengaged from a workpiece and yet which is constructed in a manner which minimizes the danger of an accidental separation during the working operation.

SUMMARY OF THE INVENTION

The present invention, which will be described in greater detail hereinafter, comprises an arbor having a pair of axially positioned, relatively movable annular members biased toward one another and having means for mounting a plurality of circumferentially spaced gripping balls that are radially displaceable to engage and grip a workpiece when the annular members are moved toward one another. Means are provided for adjustably selecting the force biasing the annular members toward each other to thereby vary the retaining force exerted by the gripping balls on the workpiece.

It is therefore an object of the present invention to provide a new and improved arbor having means which permits the selective control of the gripping forces exerted by the arbor upon a workpiece.

It is also an object of the present invention to provide an arbor which is simple in its construction, easy to operate and yet of such a design as to prevent the accidental separation of a workpiece carried thereby.

Other objects, advantages, and applications of the present invention will become apparent to those skilled in the art of arbors when the accompanying description is read in conjunction with the accompanying drawing.

BRIEF DESCRIPTION OF THE DRAWING

The description makes reference to the accompanying drawing wherein like reference numerals refer to like parts throughout the several views, and in which:

FIG. 1 is a longitudinal cross-sectional view through an arbor constructed in accordance with the principles of the present invention;

FIG. 2 is a transverse cross-sectional view of the arbor taken along line 2—2 of FIG. 1; and FIG. 3 is a transverse cross-sectional view of the arbor taken along line 3—3 of FIG. 1.

DESCRIPTION OF THE PREFERRED EMBODIMENT

Referring now to the drawing, there is illustrated a male arbor 10 constructed in accordance with the principles of the present invention, however, it is to be understood that the inventive concept disclosed herein has general application and may be employed in a variety of devices where ball grip means are employed, as, for example, female arbors, tool holders, gauges, chucks and other well known workpiece holder devices.

The male arbor 10 is adapted to support a female workpiece 12 having a longitudinal bore 13 of a diameter $D_1$ and a radially enlarged end bore 15 of a diameter $D_2$. The arbor 10 comprises a pair of coupled and axially spaced gripping ball retaining assemblies 14 and 16. The assembly 14 comprises a cylindrical hub member 18 having a radially enlarged annular flange member 20 and a longitudinal bore 22 within which is disposed a shaft 24 that supports the assemblies 14 and 16. Although it has been preferred to illustrate the assembly as including a shaft 24, it is to be understood that in some embodiments of the invention such a shaft will not be necessary and, therefore, will not be used. The cylindrical hub member 18 is fixedly secured to the shaft 24 by a set screw 26 extending through a radially disposed bore 28 in the hub member 18 and into an abutting engagement with the outer periphery of shaft 24.

The outer peripheral surface 29 of the cylindrical hub member 18 slidably supports an annular member 30. The opposing faces 31 and 33, respectively, of the annular member 30 and the flange member 20 have, proximate their peripheral surfaces, cooperating, wedging surfaces which define an annular V-shaped groove 32 within which are disposed a plurality of circumferentially spaced gripping balls 34, each ball 34 being held in position by an annular retainer ring 36. The ring 36 has a plurality of peripherally spaced apertures 37 having a diameter slightly less than the diameter of the gripping balls 34, such that each ball 34 protrudes radially outwardly through its respective aperture 37 a predetermined limited distance from groove 32. The retainer ring 36 has an outer diameter substantially the same as the outer diameters of the annular member 30 and the flange member 20, such that the outer peripheral surface of the ring member 36 is substantially flush with the outer peripheral surfaces of the members 20 and 30 when the retainer ring 36 is seated in opposing peripheral recesses 38 formed in the annular member 30 and flange member 20.

It can thus be seen that during assembly of the arbor 10, the ring member 36 is first inserted in the recess 38 in the flange member 20 and the gripping balls 34 are then placed within the apertures 37 of the retaining ring 36. The annular member 30 is then positioned on the outer surface 29 of hub member 18, thereby locating the balls 34 and retainer ring 36 in a proper position with respect to groove 32.

As can best be seen in FIGS. 1 and 2, the annular member 30 has a plurality of arcuately spaced and longitudinally disposed bores 39 opening at one end to the outer face 43 of the member 30 and communicating with the inner face 31 through smaller and axially aligned bores 40 which, in turn, are adapted to be axially aligned with a plurality of circumferentially spaced and longitudinally disposed threaded bores 42 opening to the face 33 of the flange member 20.

Fastening members 44, each having a stepped shank portion 46 and an enlarged head portion 48 are, respectively, slidably disposed in bores 40 and 39, while a threaded end portion 50 of each fastening member 44 is threadingly received in the aligned bores 42 in the flange member 20. A shoulder 52 at the end of the shank portion 46 of each of the fastening members 44 tightens against a shoulder 53 in the threaded bores 42 to securely lock the fastening members 44 in place. A spring 54 within each of the bores 39 surrounds the shank portion 46 of fastening member 44 with one end of the spring 54 bearing against washers 55 encompassing the fastening members 44 adjacent the bottom of the bore 39, while the other end of the spring 54 bears against the underside of the head portion 48 of its respective fastening member 44 to exert a force on the annular member 30 to bias the same toward the flange member 20, that is, to decrease the size of the V-shaped groove 32. The washers 55 provide a convenient means for varying the tension of the springs 54 with more or less washers 55 in place increasing or decreasing respectively the force exerted by the springs 54.

The movement of the arbor 10 into the female workpiece 12 produces a downward force on the balls 34, causing axial separation of the flange member 20 and the annular member 30 to deepen the grooves 32 to accommodate the balls 34. As the annular member 30 separates from the flange member 20, each of the springs 54 is further compressed and exerts a force of a predetermined amount on the member 30 to resist axial movement and to bias the balls 34 when the arbor 10 is in position, radially outwardly into a retaining engagement with the surface of the bore 15 of the female workpiece 12 and thus securing the same to the arbor 10.

The assembly 16 is similar in construction to the assembly 14 in that it comprises a cylindrical hub member 60 having a radially extending circular flange member 62, an annular surface 64 slidably supporting an annular member 66 and a longitudinal bore 68 through which shaft 24 extends. The opposing adjacent faces 70 and 72, respectively, of the annular member 66 and flange member 62 have cooperating wedging surfaces defining a V-shaped groove 74 within which is disposed a plurality of gripping balls 76. The gripping balls 76 are retained within the groove 74 by a retainer ring 78 disposed in peripheral recesses 80 in the members 66 and 62, such that the outer peripheral surfaces of the members 62 and 66 are flush with the outer peripheral surface of the retainer ring 78 in the same fashion as hereinbefore described with respect to the retainer ring 36. The retainer ring 78 also has a plurality of peripherally spaced apertures 79 having a diameter less than the diameter of the gripping balls 76, such that each ball 76 protrudes radially outwardly through its respective aperture 79 a limited distance.

The movable annular member 66 is also provided with a plurality of circumferentially spaced bores 82, each having a decreased diameter bore 84 axially aligned therewith and with threaded bores 86 in the flange member 62. Fastening members 88, which are of the same construction as the fastening members 44, slidably extend through bores 82 and 84 and threadedly engage the bores 86 in the flange member 62 to permit limited axial movement of the annular member 66 with respect to the flange member 62 in the same manner as hereinbefore described with respect to the ball retaining assembly 14.

Springs 90 and washer 91 are disposed in the bores 82 surrounding the shank portion of each of the fastening members 88. Each spring 90 has one end bearing against the washers 91 while the other spring end bears against the underside of a head portion 94 of each fastening member 88 to bias, with a predetermined amount of force, the annular member 66 toward the flange member 62 tending to thus radially project the balls 76 into engagement with the surface of the bore 13 of the female workpiece 12.

The hub member 18 has a threaded neck 96 which engages a threaded bore 98 in the hub member 60 to secure the two assemblies 14 and 16 together and to form the unitary arbor 10. Since the outer diameter of the ball retaining assembly 14 is slightly less than the inner diameter $D_2$ of workpiece 12 and the outer diameter of the ball retaining assembly 16 is slightly less than the inner diameter $D_1$ of the workpiece 12, the arbor 10 will firmly grip at separate locations a female workpiece having different internal diameters.

The male arbor 10 is manipulated by grasping the female workpiece 12 and inserting the male arbor 10 into the interior bores 13 and 15 of the workpiece 12, with the smaller diameter portion assembly 16 of the arbor 10 first inserted into the bore 13, followed by the larger diameter portion assembly 14 being inserted into the bore 15, such that gripping balls 34 and 76 wedge the arbor annular members 30 and 66 and flange members 20 and 62 longitudinally slightly apart. This action will exert an outwardly directed force against each of the gripping balls 34 and 76 to firmly secure the female workpiece 12 to the arbor 10. The release of the arbor 10 from the workpiece 12 is accomplished simply by pulling the workpiece 12 off the arbor 10, whereupon the balls 34 and 76 are projected radially outward by the return movement of the annular members 30 and 66 to their no-load condition.

The amount of gripping force exerted by the gripping balls 34 and 76 on the inner peripheral surfaces of the workpiece 12 is a function of the biasing force of the springs 54 and 90, that is, the force tending to move the annular members 30 and 66 toward their adjacent flange members 20 and 62. If the spring force is increased, the gripping force is likewise increased, and if the spring force is decreased, then the gripping force available to hold the workpiece 12 is likewise decreased. The spring force can, of course, be changed by providing more or less washers 55 and 91.

The present construction of the arbor 10 provides a simple but very accurate and effective means of controlling the spring force and thus the gripping force exerted on the workpiece 12 by the gripping balls 34 and 76. By simply adding or subtracting washers 55 and 91, the amount of precompression at each of the plurality of springs 54 and 90 is controlled, and thus the biasing force urging the annular members 30 and 66 toward the flange members 20 and 62 may be selectively adjusted. By controlling the force exerted by springs 54 and 90, the depth of the V-shaped grooves 32 and 74 and thus the gripping force exerted by the balls 34 and 76 on the workpiece 12 is then easily controlled.

It can thus be seen that the present invention provides a simple biasing means for coupling an annular member to a flange member of an arbor while at the same time providing for the selective control of the amount of biasing force available.

Although only one embodiment of the present invention has been disclosed, it is to be understood by those skilled in the art of arbors, that other forms may be had all coming within the spirit of the present invention and the scope of the appended claims.

What is claimed is as follows:

1. A means for receiving and retaining a workpiece or the like comprising:
   a pair of axially spaced and relatively movable members having adjacent tapered wedging surfaces defining a ball receiving groove;
   gripping balls in said groove, said gripping balls normally projecting radially from said groove in response to the relative axial approach of said members, said gripping balls being retracted into said grooves in response to the relative axial separation of said members;
   means limiting the radial projection of said balls from said groove when said members approach one another;
   means coupling said members to one another;
   said coupling means comprising a plurality of circumferentially spaced and longitudinally disposed bores in one of said members, a plurality of fastening screws extending through said bores and threadedly engaging a plurality of axially aligned and circumferentially spaced threaded bores in the other of said members, a plurality of springs disposed in said first mentioned bores and wound around said fastening screws, said springs engaging a portion of their associated fastening screws and bores to bias said one member toward said other member.

2. The means defined in claim 1 wherein said other of said members has a hub portion and said one member has a bore axial aligned with and slidably engaging said hub portion such that said one member is axially slidably movable on said hub portion to and away from said other member.

3. The means defined in claim 1 wherein said means limiting the radial projection of said balls comprises a ring having apertures through which said balls are adapted to project, the size of said apertures being less than the diameter of said balls, said ring being axially disposed between said members proximate the terminal portion of said groove, said members axially positioning said ring with respect to said groove.

4. The means as defined in claim 1 and including a plurality of washers encompassing said fastening screws, said springs having one end bearing against said washers.

5. An arbor for retaining a workpiece having a multi-diameter cross section, said arbor comprising:
   a first and a second pair of axially positioned and relatively separable annular members respectively of a first diameter and a second smaller diameter, each of said pairs of annular members respectively having adjacent tapered wedging surfaces defining ball receiving grooves;
   gripping balls in said grooves normally projecting radially from said grooves in response to the relative axial approach of said annular members of each of said pairs of members;
   means limiting the radial projection of said balls from their respective grooves;
   first and second means respectively coupling said first pair and said second pair of members;
   means associated with each of said coupling means to bias their associated pair of annular members toward one another at predetermined forces so as to normally radially project their associated balls from said grooves;
   means associated with each of said coupling means for selectively controlling said predetermined forces;
   means fixedly attaching a first annular member of said first pair of members to a first annular member of said second pair of members such that said first annular members are movable as a unit;
   said first annular members of each of said pairs of members having a hub portion on which the other, second annular members of each of said pair of members is slidably mounted for movement toward and away from its associated first annular member, said hub portion of said annular members of each of said pairs being fixedly attached to one another, said second annular members of each of said pairs having bores and fastening screws slidably extending therethrough and into a threaded engagement with bores in said first annular members in each of said pairs and spring means carried in said bores in said second annular members and engaging said fastening screws to bias said second annular members respectively toward said first annular members.

* * * * *